June 7, 1932. W. W. STEPHENS 1,862,498
APPARATUS FOR FORMING WEFTLESS CORD FABRIC
Filed May 31, 1930

Inventor
William W. Stephens.
By Bee & Bush
Attorneys

Patented June 7, 1932

1,862,498

UNITED STATES PATENT OFFICE

WILLIAM W. STEPHENS, OF AKRON, OHIO, ASSIGNOR TO THE GOODYEAR TIRE & RUBBER COMPANY, OF AKRON, OHIO, A CORPORATION OF OHIO

APPARATUS FOR FORMING WEFTLESS CORD FABRIC

Application filed May 31, 1930. Serial No. 457,863.

The invention relates to an apparatus for making weftless cord fabric and it has particular relation to a device for guiding a series of parallel strands of material which are to be embedded in rubber.

An object of the invention is to provide a guiding device for a multiplicity of cords that can be easily and quickly mounted on or demounted from a calender adapted to embed the cords in a sheet of rubber.

Another object of the invention is to provide a device normally for guiding a multiplicity of cords, in which the cords are retained in threaded relation to the device and prevented from sagging while the calender is employed for other purposes.

In the manufacture of rubberized cord fabric, a cord guiding or spacing device is provided on a calendering machine for guiding the cords to the calender rollers in properly spaced relation. This device comprises a comb for initially separating the cords and a grooved spacing bar positioned in the calender rollers for accurately spacing the cords. Heretofore, when it was desired to substitute cords of a different size for those threaded through the device, it has been necessary to remove the threads or cords from the device and then thread the other cords through the comb and under the spacing bar. The latter operation was very tedious and considerable time was required before all the cords could be properly positioned in the device.

According to this invention the necessity of rethreading cords has been obviated by providing cord-guiding devices removable with respect to the calendering machine and means for clamping the cords in their operative positions when the devices are removed or, are inoperative. Hence, one series of cords may be substituted for another series merely by substituting one device for another. Also, the cords can be maintained in their proper positions at all times.

Figure 1:
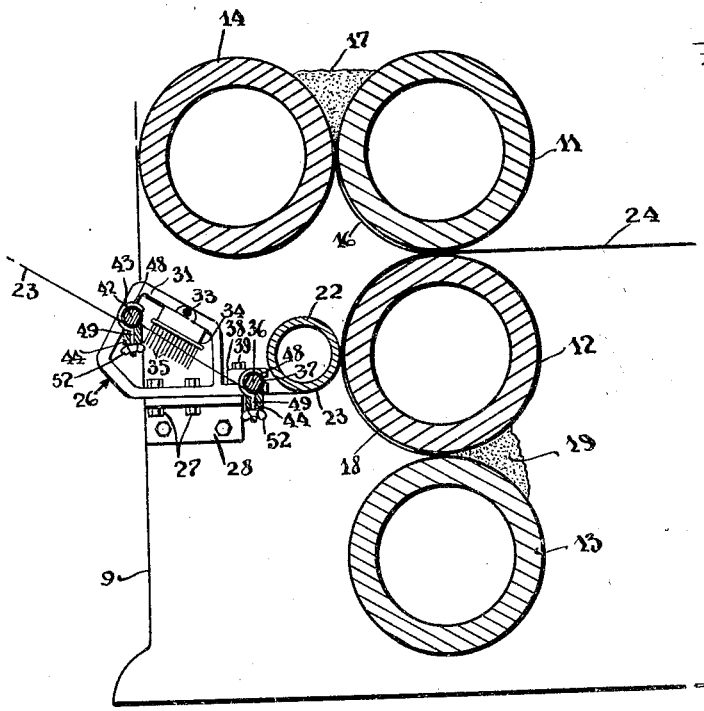
Figure 2:
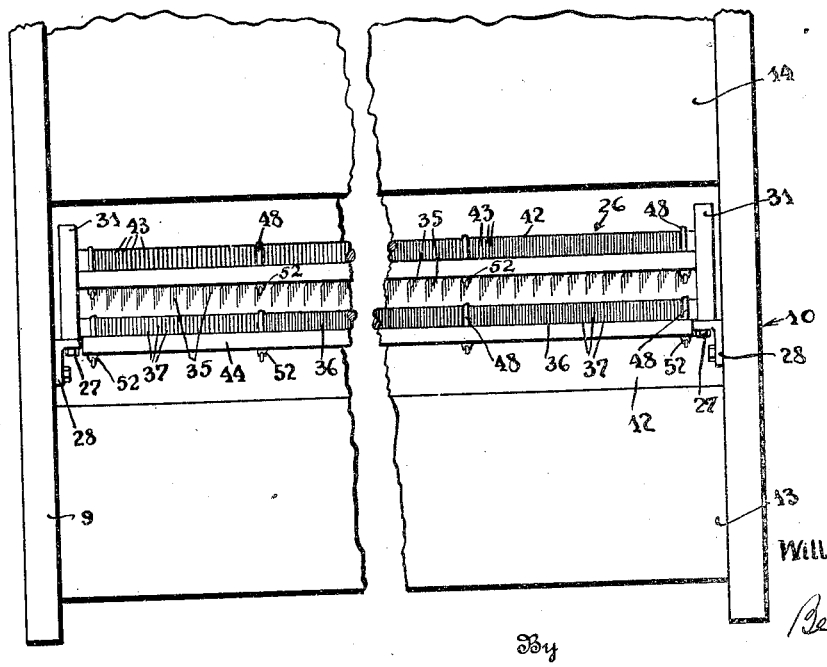

For a better understanding of the invention, reference may now be had to the accompanying drawing, forming part of this specification in which:

Fig. 1 is a fragmentary cross-sectional view of a calendering machine having a cord guiding device secured thereto constructed according to and adapted for practicing the invention; and Fig. 2 is a fragmentary front elevational view of the calendering machine shown by Fig. 1.

In the embodiment of the invention illustrated, frame members 9 and 10 support horizontally disposed, vertically aligned rollers 11, 12 and 13, and a fourth horizontal roller 14 at one side of the roller 11. A sheet of rubber 16 is formed on the roller 11 from a bank of stock 17 between the rollers 11 and 14, and a similar sheet of rubber 18 is formed on the roller 12 from a bank of stock 19 between the rollers 12 and 13. A roller 22 positioned adjacent the roller 12 is adapted to direct and press a series of properly spaced cords 23 into the sheet rubber 18 on the roller 12. Then, the sheets of rubber 16 and 18 together pass between the rollers 11 and 12, to produce rubberized, weftless cord fabric 24.

The cords 23 are arranged in spaced relation and are so guided into engagement with the under side of the roller 22 by a guiding device 26 comprising a pair of brackets 31 removably secured respectively by bolts 27 to supporting members 28 secured to the frame members 9 and 10. A comb 34 having teeth 35 thereon for initially spacing the cords extends between intermediate portions of the brackets 31 and is secured to the latter, as indicated at 33. Also, a rod 36 having longitudinally spaced circumferentially extending grooves 37 for accurately spacing the cords, is rigidly secured to the brackets 31 adjacent the roller 22 by means of plates 38 clamping the ends of the bar in recesses in the brackets. These plates are secured to the brackets by bolts 39. A second rod 42 having circumferentially extending grooves 43 similar to the grooves 37 in the rod 36 is rigidly secured to the other end of the brackets 31. In operating the device 26, the cords 23 are threaded between the teeth 35 of the comb, then in the grooves 37 of the rod 36, and finally are directed to the under side of the roller 22.

When the cords are not employed in conjunction with the calender or when a change in size of cords is desired, the cords in the device are clamped in position by means of bars 44 and 45 which are adapted to abut the under side of the rods 36 and 42, respectively. Each bar is secured to the corresponding rod by a plurality of clamps 48 partially encircling the rod and having a shank 49 projecting through the bar. Wing nuts 52 are threaded on the free ends of the shanks 49 for moving the bars. After the bars 44 and 45 are clamped against the rods 36 and 42, the cords are cut adjacent the roller 22 and the guiding device 26 either can be removed from the calender or retained thereon. In either event the cords are maintained properly separated. If cords of another size are to be directed through the calender, another device having such cords threaded therethrough may be quickly substituted for the device removed.

From the foregoing description, it is apparent that a device has been provided for guiding a multiplicity of cords, in which the cords are always retained in parallelism and prevented from sagging when the calender is employed for other purposes.

Although only the preferred form of the invention has been described and shown in detail, it will be apparent to those skilled in the art that the invention is not so limited but that various minor modifications may be made therein, without departing from the spirit of the invention or from the scope of the appended claims.

What I claim is:

1. The combination with a calender having a plurality of rollers mounted in superposed relation, of a unitary guiding device for directing a multiplicity of cords to the calender in parallel relation, comprising means for removably securing the entire device to the calender, means for spacing the cords, and a pair of clamping means associated with the last mentioned means for preventing the cords from sagging when the guiding device is removed from the calender.

2. The combination with a calender having a plurality of rollers mounted in superposed relation, of a unitary guiding device for directing a multiplicity of cords to the calender in parallel relation, comprising means for removably securing the entire device to the calender, means for spacing the cords, and clamping means including a pair of bars contacting with the cords at spaced points for preventing the cords from sagging.

3. The combination with a calender having a plurality of rollers mounted in superposed relation, of a guiding device for directing a multiplicity of cords to the calender in parallel relation, comprising a pair of grooved rods for spacing the cords, a pair of bars, and a plurality of clamps for clamping the bars and rods together and maintaining the cords in parallel relation.

4. The combination with a calender having a plurality of rollers mounted in superposed relation, of a guiding means for directing a multiplicity of cords to the calender in parallel relation, comprising a pair of brackets removably secured to the calender, a pair of grooved rods rigidly secured to the brackets, a pair of bars adapted to contact with the grooved rods for maintaining the cords in parallel relation when not in use, and a plurality of clamps for securing the bars to the rods.

In witness whereof, I have hereunto signed my name.

Signed at Akron, in the county of Summit and State of Ohio, U. S. A., this 28th day of May, 1930.

WILLIAM W. STEPHENS.